United States Patent Office 2,766,215
Patented Oct. 9, 1956

2,766,215

PROCESS FOR POLYMERIZING CHLOROTRI-FLUOROETHYLENE

William N. Stoops and Bruce Thompson, Charleston, W. Va., assignors to Union Carbide and Carbon Corporation, a corporation of New York No Drawing. Application August 19, 1953, Serial No. 375,301

6 Claims. (Cl. 260—29.6)

This invention relates to a process for making aqueous dispersions of polychlorotrifluoroethylene, and to the recovery of the resin from such dispersions in a particle size suitable for making dispersions of such resin in organic liquids (such dispersions being commonly termed organosols).

Chlorotrifluoroethylene polymer is customarily made by a bulk polymerization process and is obtained from such process as a white, fluffy powder. The particle size may range from 0.1 micron to 500 microns or larger with an average particle size of about 50 microns. By grinding this resin in a pebble mill with a non-reactive dispersant such as "Solvesso" No. 150 or other light hydrocarbon fraction, the particle size is generally reduced within about 150 hours to a range of 0.05 to 50 microns with an overall average of about 5 microns. Even in this particle-size range, stable dispersions are not obtained. The resin particles flocculate and settle rapidly unless constantly agitated. Prolonged grinding of the resin beyond 150 hours seldom brings commensurable improvement.

The prolonged grinding required to reduce the bulk-polymerized resin to an organosol of suitable viscosity is accompanied by a sharp drop in the molecular weight of the resin as measured by the melt-viscosity of the resin. Resins showing an initial melt-viscosity of around 50 megapoises generally show a melt-viscosity of only 20 to 30 megapoises upon completion of the grinding, which normally requires about 150 hours. (Melt-viscosity is defined as viscous deformation free from elastic effects and is measured using the method of G. J. Dienes and H. F. Klemm as described in the Journal of Applied Physics for June 1946 (vol. 17, No. 6, pp. 458–471).)

Efforts to obtain polymers of chlorotrifluoroethylene through the use of emulsion polymerization techniques employing conventional emulsifiers have been generally unsatisfactory. In some instances the emulsifying agent appeared to inhibit the polymerization of the monomer so that no polymer was formed. In those cases employing emulsifiers that did not completely inhibit the polymerization reaction, the resulting polymer was brittle and of little practical value. Furthermore, the occlusion of the emulsifier within the polymer apparently promotes thermal degradation and discoloration of the resin at temperatures in excess of about 100° C. which is well below the normal service temperature of about 150° C. to 200° C. for bulk-polymerized polymer.

One of the objects of this invention is to provide a process for polymerizing chlorotrifluoroethylene in aqueous emulsion.

Another object of the invention is to produce stable aqueous dispersions of chlorotrifluoroethylene polymers.

A further object of the invention is to produce chlorotrifluoroethylene polymers of a particle size suitable to permit the ready preparation of stable organosols and hydrosols.

An additional object is to provide a chlorotrifluoroethylene resin of small particle size that does not undergo appreciable loss in molecular weight during the pebble-mill grinding procedure used in the preparation of organosols.

We have found that stable aqueous dispersions of polymeric chlorotrifluoroethylene of controlled particle size are formed by polymerizing the chlorotrifluoroethylene monomer in an aqueous dispersion containing a dispersing agent of a type compatible in structure with the chlorotrifluoroethylene polymer and which can be derived from the chlorotrifluoroethylene polymer itself. Such dispersing agents are perhaloalkanoic acids and their salts of the structure:

$$F(CClFCF_2)_n CClF\ COOH$$

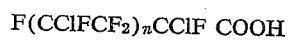

where $n$ is an integer, preferably having an average molecular weight from 250 to 1000.

These new emulsifying agents are readily obtained by the oxidation of polychlorotrifluoroethylene resins at temperatures of between 300° C. and 400° C. as described in the pending patent application Serial No. 368,224, "Process for Making Perhaloacylhalides," filed July 15, 1953, by J. W. Clark and C. E. Rectenwald. Briefly, this process consists of heating to between 250° C. and 375° C. polychlorotrifluoroethylene resins which are in intimate contact with air or oxygen. The volatile products, principally the perhaloacylhalides, are collected in suitable condensers and are fractionally distilled to collect products of selected boiling points. The hydrolysis or neutralization of these products as well as the non-volatile kettle residues yield the acids or the salts of the acids with, for instance, alkali metals or ammonia, which are the emulsifying agents of this invention.

The particle size of the chlorotrifluoroethylene polymer formed by the emulsion polymerization of the monomer, is controlled by the concentration of emulsifying agent used; high concentrations of emulsifier yielding small particle size resin and low concentrations yielding large particles. Thus, for producing resin of a particle size from 0.04 micron to 1 micron the concentration of emulsifying agent on the weight of the monomer should be about 1% to 3%. Coarser particle sizes can be obtained by using a concentration as low as 0.1%, and resin of finer particle sizes can be made by using concentrations of emulsifying agent as high as 5% by weight of the monomer. Also, if a high ratio of monomer to water is employed, higher concentrations of emulsifying agent are desirable. On the other hand, extremely low concentrations of emulsifying agent are undesirable as the rate of polymerization is thereby reduced.

In the preparation of organosols and hydrosols of polychlorotrifluoroethylene, fine particle size resin in the neighborhood of 0.04 micron to 1 micron is highly desirable since the fine particles do not tend to flocculate as readily as the larger particles and the dispersions are more stable and show a better shelf-life. On the other hand, stronger and more durable coatings result from those organosols and hydrosols that contain both large particles in the neighborhood of 1 micron and small particles in the neighborhood of 0.04 micron in that a better degree of packing of the particles, somewhat analogous to a mixture of sand and gravel, is obtained. For this reason the control of the resin particle size described above is of value and permits organosols and hydrosols for specific applications to be made by selecting those conditions that yield resins of the proper particle size or by blending resins to obtain the proper distribution of particle sizes.

Unlike the chlorotrifluoroethylene polymers produced by bulk polymerization, the emulsion-polymerized resins are not degraded to polymers of lower melt-viscosity during the milling required for the preparation of organosols.

For example, an average emulsion-polymerized resin containing agglomerated particles ranging from 0.1 to 500 microns which are composed of ultimate particles of about 0.04 to 0.1 micron in size and an initial melt viscosity of 50 megapoises can be ground in 4 hours to a useable organosol having particles in the range of 0.04 to 1.0 micron with no apparent change in melt-viscosity.

In common with other emulsion polymerizations, the polymerization of chlorotrifluoroethylene in aqueous emulsion requires the presence of a water-soluble polymerization catalyst. Suitable catalysts include potassium persulfate, sodium persulfate, ammonium persulfate, the corresponding perborates and percarbonates, hydrogen peroxide and the like. The catalyst concentration may vary from 0.2% to 5% by weight of the monomer, the lower catalyst concentrations yielding resins of higher molecular weight. Redox polymerization techniques may also be employed, by including a reducing agent, such as sodium bisulfite, with the polymerization charge. Such systems have the advantages that lower polymerization temperatures may be employed resulting in resins of higher molecular weight and also that the polymerization rate is faster. On the other hand, the redox system has the disadvantage that the polymers formed are somewhat cross-linked in structure and it is more difficult to obtain high conversions of monomer to resin. Buffering agents, such as ammonium carbonate, may also be used to control the pH.

The polymerization temperature may vary from about 15° C. to about 90° C., resins of higher molecular weight being formed at the lower temperatures.

The stable aqueous dispersions of chlorotrifluoroethylene resin that are obtainable through the use of perhaloalkanoic acids and their salts as polymerization emulsifiers may, when suitably thickened, be used to cast films or form coatings which show the same high softening point as coatings formed from organosols.

To form a dispersion of the polymer in an organic liquid, the polymer particles in the aqueous dispersion are coagulated, as by the addition of an acid, to form agglomerates made up of the individual resin particles. These agglomerates are then broken down by ball-milling the resin with a suitable organic liquid to form a dispersion, customarily termed an organosol. Such liquids include the hydrocarbons, both aliphatic, alicyclic and aromatic, such as the aliphatic hydrocarbons, pentane, hexane, heptane, octane, and higher mixtures, such as kerosene; the alicyclic hydrocarbons, such as cyclohexane and methyl cyclohexane; and the aromatic hydrocarbons, such as benzene, toluene and ethylbenzene. Mixtures of the three types of hydrocarbon may be employed, particularly mixtures of aliphatic or alicyclic hydrocarbons with aromatic hydrocarbons. Such mixtures are available on the market as the thinners and diluents customarily supplied to the paint and varnish industry.

The following examples will serve to illustrate the invention:

Example 1

A stainless-steel bomb of four liter capacity was charged with 1600 grams of water, 4.0 grams of potassium persulfate catalyst, 2.0 grams of solution bisulfite reducing agent, 4.0 grams of ammonium carbonate monohydrate as a pH control agent and an emulsifying agent containing 4.0 grams of perhaloalkanoic acids (derived from the partial oxidation of polychlorotrifluoroethylene) which boiled between 125° C. and 220° C. at 1 mm. pressure and had an average molecular weight of about 1000. The 4.0 grams of perhaloalkanoic acid was reacted with 85 cc. of one-tenth normal sodium hydroxide for one hour at 60° C. to form the sodium salt used as the emulsifying agent. Monomeric chlorotrifluoroethylene (400 grams) was then added to the bomb from which the air had been evacuated. The bomb temperature was regulated at 30° C. and placed on a rocker operating at 37 cycles per minute.

The polymerization reaction was terminated at the end of 7.67 hours by which time 12.5% of the monomer had been converted to polymer. The polymer was coagulated by adjusting the pH to about 6 using dilute hydrochloric acid, heating to between 40° C. and 50° C. and adding, with rapid agitation, sufficient calcium chloride solution to effect complete coagulation. The polymer was washed thoroughly with water and dried in a circulating air oven at 150° C. The resin showed an initial melt-viscosity of 648 megapoises as measured with a parallel-plate plastometer.

Example 2

Following the procedure of Example 1, a nickel bomb of one and one-half (1½) liter capacity was charged with 400 grams of water, 2.0 grams of potassium persulfate, 1.0 gram of sodium bisulfite, 2.0 grams of ammonium carbonate monohydrate and 100 cc. of emulsifier solution containing 6.0 grams of perhaloalkanoic acid showing a boiling point of >50° C. at 1 mm. pressure and an average molecular weight of about 900. The emulsifier solution was prepared by combining 6 grams of the above perhaloalkanoic acid with 25 cc. of one-half normal sodium hydroxide and 75 cc. of water and heating to 50° C. for one hour. Chlorotrifluoroethylene monomer (200 grams) was then charged to the bomb from which the air had been evacuated and the polymerization reaction was conducted at 30° C. for three hours by which time 67% of the monomer had been converted to polymer. The resulting stable emulsion was coagulated, washed and dried following the procedure described in Example 1 and the recovered polymer showed a melt-viscosity of 263 megapoises.

Example 3

Using the equipment and procedures of Example 2, the nickel bomb was charged with 400 grams of water, 2.0 grams of potassium persulfate, 2.0 grams of ammonium carbonate monohydrate and 100 cc. of emulsifier solution containing 6 grams of the perhaloalkanoic acid described in Example 2. As in the previous example the perhaloalkanoic acid was neutralized with 25 cc. of one-half normal sodium hydroxide and 75 cc. of water at 50° C. for one hour prior to being charged to the reactor. 200 grams of chlorotrifluoroethylene monomer were then charged to the reactor from which the air had been evacuated. In order to obtain a low molecular weight polymer the polymerization reaction was conducted at 70° C. After three hours, by which time 59% of the monomer had been converted to polymer, the reaction was terminated and the polymer was recovered as in Example 2. The polymer showed a melt-viscosity of 0.2 megapoise.

Example 4

Using the equipment and procedures of Example 2, the nickel bomb was charged with 700 grams of water, 300 grams of monomeric chlorotrifluoroethylene, 3.0 grams of ammonium persulfate, 2.0 grams of ammonium sulfate monohydrate, 3.0 grams of ammonium carbonate monohydrate and 9.0 grams of the ammonium salt of the perhaloalkanoic acid of Example 2. The polymerization was conducted at 30° C. for three hours at the end of which time the resulting polymer latex was acidified with one milliliter of concentrated hydrochloric acid and after heating to about 50° C. was coagulated with 10 ml. of 38% calcium chloride solution. The polymer was washed three times with water and dried at 70° C. The recovered polymer weighed 210 grams and showed an initial melt-viscosity of 18 megapoises.

Example 5

Using the equipment and procedures of Example 2, the nickel bomb was charged with 400 grams of water, 200 grams of monomeric chlorotrifluoroethylene, 2.0 grams of potassium persulfate, 2.0 grams of ammonium carbonate monohydrate and 6.0 grams of the sodium salt of the perhaloalkanoic acid made as in Example 2. The polymerization was conducted at 50° C. for four hours, at the end of which time the resulting polymer latex was heated to about 50° C. and coagulated with 10 ml. of 38% calcium chloride solution. After washing the polymer repeatedly with water it was dried. The recovered polymer weighed 46 grams and showed an initial melt viscosity of 2.9 megapoises.

*Example 6*

To obtain a fine-particle size chlorotrifluoroethylene resin for use in the preparation of organosols a lead-lined autoclave of 7-gallon capacity equipped with a radial propeller agitator operating at 400 R. P. M. and jacketed for temperature control was charged with the following:

200 parts of water
100 parts of chlorotrifluoroethylene monomer
1 part potassium persulfite
0.5 part sodium bisulfite
1 part ammonium carbonate
1.8 part concentrated aqueous ammonia
0.27 part sodium hydroxide
2.5 parts of perhaloalkanoic acid The perhaloalkanoic acid had a molecular weight of 728 and a boiling range of 50° C. at 1 mm. pressure.

The sodium hydroxide was dissolved in part of the water, heated to 50° C. and the perhaloalkanoic acid added. This solution was stirred until the acid was completely dissolved. The catalyst, activator and buffer were dissolved in other portions of the water and all the solutions added to the autoclave. The vapor space was flushed with monomer vapors and the monomer was charged in the vapor phase. The autoclave temperature was controlled at 30° C. for 16.9 hours by which time 41% of the monomer had been converted to polymer. The resin was recovered by adding calcium chloride and heating to boiling, washed with demineralized water and dried at 60° C. on glass trays in a vacuum dryer. The recovered resin showed a melt viscosity of 66 megapoises and a particle size as measured by electromicrographs of approximately 0.04 micron.

A one-quart ceramic container was charged with 770 grams of flint pebbles, 67 grams (25%) of the above resin and 200 grams (75%) of Solvesso No. 150, a hydrocarbon fraction used in the coatings industry as a diluent or thinner. The container was placed on a rolling apparatus and revolved at 82 R. P. M. At the end of four hours the contents of the container were examined and found to be a smooth and apparently uniform fluid which showed a consistency of 42 centistokes as measured by a No. 2 Parlin Cup. The Parlin Cup is well known to the paint industry as a paint consistency measurement device and is explained in the article: "Du Pont-Parlin Viscosity Cup" appearing in Organic Finishing, pp. 41–7, September 1945.

A 1-inch by 6-inch steel panel was dipped into the organosol thus prepared and withdrawn at the rate of 8.9 inches per minute. After baking the dipped panel at 500° F. for five minutes the coating was tough and clear.

Using a casting knife, a film of the organosol was applied to a steel panel which was then baked at 500° F. for five minutes to yield a tough, clear and continuous coating free of pin holes or other blemishes.

*Example 7*

This experiment illustrates, for comparison, the preparation of an unsatisfactory organosol from bulk-polymerized chlorotrifluoroethylene resin.

A stainless steel polymerization bomb 18 inches in diameter by 4 feet in length equipped with a charging connection, safety valve, pressure gage and coated internally with a heat-reactive phenol-formaldehyde coating was charged with 22.7 grams of bis(dichloroacetyl)-peroxide dissolved in 567 ml. of "Freon" 113 (trichlorotrifluoroethane) and 22,700 grams (50 lbs.) of liquid monomeric chlorotrifluoroethylene. The bomb was rotated slowly in a water bath controlled at 5° C. for the first eight hours operation, 10° C. for the second eight hours and at 12.5° C. for the next 50 hours for a total of 66 hours. The unreacted monomer was stripped from the reactor and 13,850 grams (30.5 pounds) of resin was obtained for a conversion of 61%. The resin showed a melt-viscosity of 50.6 megapoises.

A one-gallon capacity ceramic container was charged with two quarts of flint pebbles, 320 grams (20%) of the above resin and 1280 grams (80%) of "Solvesso" 150, a hydrocarbon fraction used in the paint industry as a diluent or thinner. The container was placed on a rolling apparatus and revolved at 68 R. P. M. At the end of 24 hours the contents were examined and found to be poorly dispersed and too thick and viscous for use in dip-coating or knife-coating applications. A check of the contents after grinding for 48 hours and for 72 hours showed only minor improvement in viscosity and dispersion. After 164 hours grinding the contents showed a viscosity of 19.3 seconds with a No. 2 Zahn Cup, a paint consistency measuring device well known to the paint industry.

The organosol thus obtained was sufficiently fluid for dip-coating and knife-coating applications, but it required constant agitation with a mechanical stirrer to maintain the dispersion and to prevent premature settling of the resin particles.

A comparison of these results with those obtained in Example 6 show that the emulsion-polymerized resins can be ground to a uniformly dispersed and stable organosol of 25% total solids within a matter of four hours while the bulk-polymerized resins require as much as 164 hours to yield an unstable organosol that can only be used providing adequate agitation is supplied to prevent the premature settling of the resin.

*Example 8*

This example illustrates the preparation of a copolymer of chlorotrifluoroethylene and vinylidene fluoride employing the emulsion process.

Using the equipment and procedures of Example 2, the nickel bomb was charged with 15 grams of monomeric vinylidene fluoride, 285 grams of monomeric chlorotrifluoroethylene, 3.0 grams of ammonium persulfate, 1.5 grams of ammonium carbonate monohydrate, 6.0 grams of the sodium salt of the perhaloalkanoic acid described in Example 2 and 700 grams of water. The polymerization was conducted at 40° C. for 4 hours for a conversion of 52.5%. The recovered resin showed an initial melt viscosity of 82 megapoises.

The above procedure was repeated in every respect with the single exception that the polymerization reaction was stopped at the end of 1¼ hours for a conversion of 14.5%. The recovered copolymer showed an initial melt viscosity of 54.

The two samples of resin thus obtained were insoluble at room temperature in acetone, cyclohexanone, dimethylformamide and carbon tetrachloride.

What is claimed is:

1. Process for forming aqueous dispersions of polymeric chlorotrifluoroethylene, which comprises dispersing monomeric chlorotrifluoroethylene in an aqueous solution containing a water-soluble polymerization catalyst and as a dispersing agent one of the group consisting of perhaloalkanoic acids of the structure:

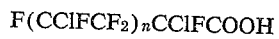

F(CClFCF$_2$)$_n$CClFCOOH and their salts, where $n$ is an integer, and polymerizing the dispersed chlorotrifluoroethylene.

2. Process for forming aqueous dispersions of polymeric chlorotrifluoroethylene, which comprises dispersing monomeric chlorotrifluoroethylene in an aqueous solution containing a water-soluble polymerization catalyst and as a dispersing agent a salt of a perhaloalkanoic acid formed by oxidation of polymeric chlorotrifluoroethylene, said perhaloalkanoic acid having an average molecular weight from about 250 to about 1000, and polymerizing the dispersed chlorotrifluoroethylene.

3. Process for forming aqueous dispersions of polymeric chlorotrifluoroethylene, which comprises dispersing monomeric chlorotrifluoroethylene in an aqueous solution containing a water-soluble polymerization catalyst and as a dispersing agent an alkali-metal salt of a perhaloalkanoic acid formed by oxidation of polymeric chlorotrifluoroethylene, said perhaloalkanoic acid having an average molecular weight from about 250 to about 1000, and polymerizing the dispersed chlorotrifluoroethylene.

4. Process for forming aqueous dispersions of polymeric chlorotrifluoroethylene, which comprises dispersing monomeric chlorotrifluoroethylene in an aqueous solution containing a water-soluble polymerization catalyst and as a dispersing agent a sodium salt of a perhaloalkanoic acid formed by oxidation of polymeric chlorotrifluoroethylene, said perhaloalkanoic acid having an average molecular weight from about 250 to about 1000, and polymerizing the dispersed chlorotrifluoroethylene.

5. Process for forming aqueous dispersions of polymeric chlorotrifluoroethylene, which comprises dispersing monomeric chlorotrifluoroethylene in an aqueous solution containing a water soluble polymerization catalyst and as a dispersing agent an ammonium salt of a perhaloalkanoic acid formed by oxidation of polymeric chlorotrifluoroethylene, said perhaloalkanoic acid having an average molecular weight from about 250 to about 1000, and polymerizing the dispersed chlorotrifluoroethylene.

6. An organosol comprising a dispersion of an emulsion-polymerized chlorotrifluoroethylene polymer in a hydrocarbon liquid, said chlorotrifluoroethylene polymer having been polymerized in the presence of an emulsifying agent comprising a salt of a perhaloalkanoic acid formed by oxidation of a chlorotrifluoroethylene polymer, said perhaloalkanoic acid having an average molecular weight from about 250 to about 1000.

References Cited in the file of this patent

UNITED STATES PATENTS

| | | |
|---|---|---|
| 2,559,752 | Berry | July 10, 1951 |
| 2,656,332 | Sprung | Oct. 20, 1953 |